United States Patent [19]

Decker

[11] E Re. 30,619

[45] Reissued May 19, 1981

[54] CONTROL SYSTEM AND METHOD AND CONTROL DEVICE THEREFOR

[75] Inventor: Cloyd E. Decker, Indiana, Pa.

[73] Assignee: Robertshaw Controls Company, Richmond, Va.

[21] Appl. No.: 80,110

[22] Filed: Sep. 28, 1979

Related U.S. Patent Documents

Reissue of:

[64] Patent No.: 4,110,601
Issued: Aug. 29, 1978
Appl. No.: 795,403
Filed: May 9, 1977

U.S. Applications:

[63] Continuation of Ser. No. 550,456, Feb. 18, 1975, abandoned.

[51] Int. Cl.[3] ..... H05B 1/02

[52] U.S. Cl. ..... 219/506; 219/248; 219/494; 340/584

[58] Field of Search ..... 219/506, 490, 494, 507, 219/457; 337/332, 376, 417, 79; 340/501, 584

[56] References Cited

U.S. PATENT DOCUMENTS

| | | | |
|---|---|---|---|
| 2,450,399 | 11/1941 | Sheidler | 219/453 |
| 2,593,812 | 4/1952 | Turner | 219/248 |
| 3,612,826 | 10/1971 | Deaton | 219/506 |

*Primary Examiner*—C. L. Albritton
*Assistant Examiner*—M. Paschall
*Attorney, Agent, or Firm*—Candor, Candor & Tassone

[57] ABSTRACT

A control system having a thermostatically operated control device for operatively interconnecting a heater to a source of energy when the output effect of the heater is below a predetermined setting of the control device and to disconnect the heater from the source of energy when the output effect of the heater is above the predetermined setting of the control device, the control device operating an indicating light to indicate that the output effect of the heater is still above a certain value when the control means is in an "off" setting thereof.

17 Claims, 11 Drawing Figures

CONTROL SYSTEM AND METHOD AND CONTROL DEVICE THEREFOR

Matter enclosed in heavy brackets [ ] appears in the original patent but forms no part of this reissue specification; matter printed in italics indicates the additions made by reissue.

This is a continuation, of U.S. Pat. application Ser. No. 550,456, filed Feb. 18, 1975, now abandoned.

This invention relates to an improved control system for a heating element or the like and to a method of making such a control system as well as to a control device for such a system or the like.

It is well known that control systems for heater means have been provided wherein each system includes an indicating means that will be turned on whenever the control system is in an "on" condition thereof.

It is a feature of this invention to provide such a control system wherein the indicating means is also utilized to indicate that the output heating effect of the heating means is above a certain value when the control system is disposed in an "off" setting thereof whereby such indicating means will provide a warning that the heating means is at an unsafe temperature for maintenance purposes, etc.

In particular, one embodiment of this invention provides a control system having a source of energy means, heater means, indicator means, and a thermostatically operated control means operatively interconnected to the other means to interconnect the heater means to the energy means when the output effect of the heater means is below a predetermined setting of the control means and to disconnect the heater means from the energy means when the output effect of the heater means is above the predetermined setting of the control means. The control means is so constructed and arranged that the same will operate the indicator means to indicate that the output effect of the heater means is still above a certain value when the control means is in an "off" setting thereof.

Accordingly, it is an object of this invention to provide an improved control system having one or more of the novel features set forth above or hereinafter shown or described.

Another object of this invention is to provide an improved control device for such a system or the like.

Other objects, uses and advantages of this invention are apparent from a reading of this description, which proceeds with reference to the accompanying drawings forming a part thereof and wherein.

Figure 1:
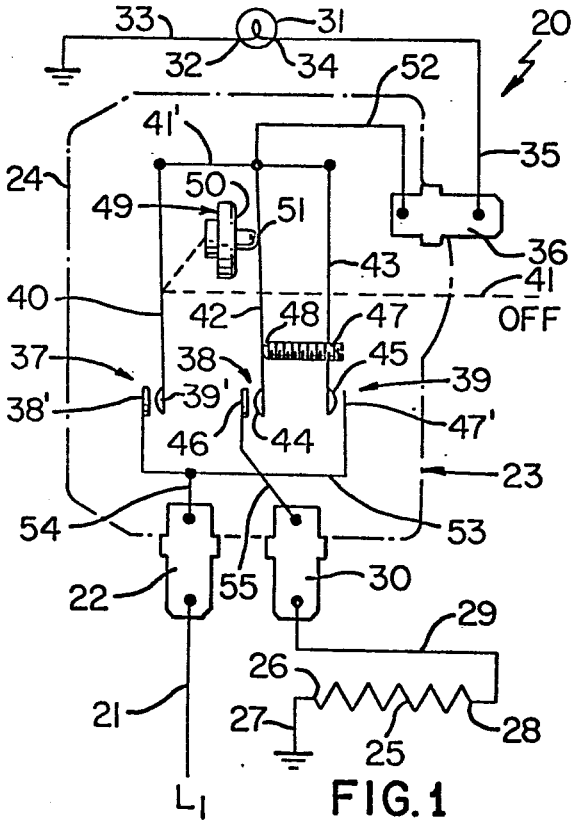
FIG. 1 is a schematic view illustrating the control system of this invention when set in an "off" condition thereof and the output temperature effect of the heating means is below a certain value thereof.

While various features of this invention are hereinafter described and illustrated are being particularly adapted to provide a control system for an electrical heating means, it is to be understood that the various features of this invention can be utilized singly or in any combination thereof to provide a control system for other types of heating means as desired.

Therefore, this invention is not be be limited to only the embodiments illustrated in the drawings, because the drawings are merely utilized to illustrate one of the wide variety of uses of this invention.

Figure 3:
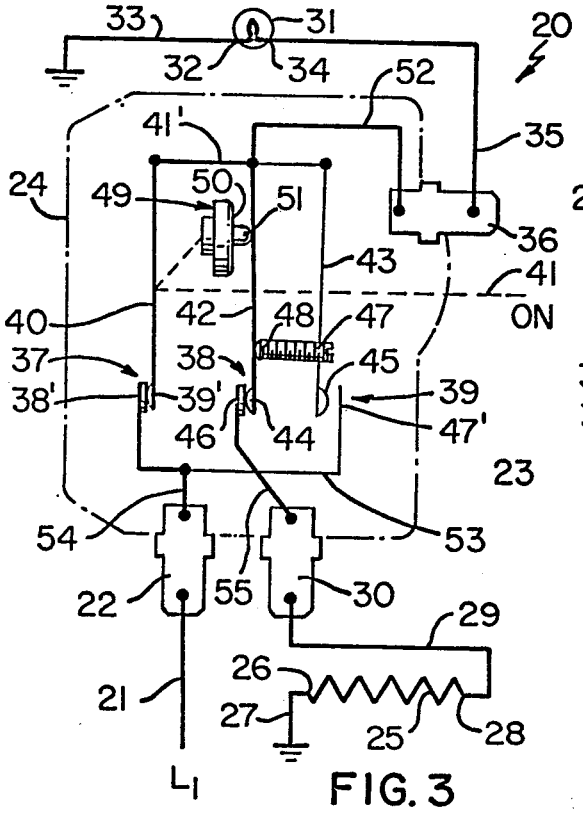
FIG. 3 is a view similar to FIG. 1 and illustrates the control system when in an "on" condition thereof and a demand is being made for operation of the heating means thereof.
Figure 4:
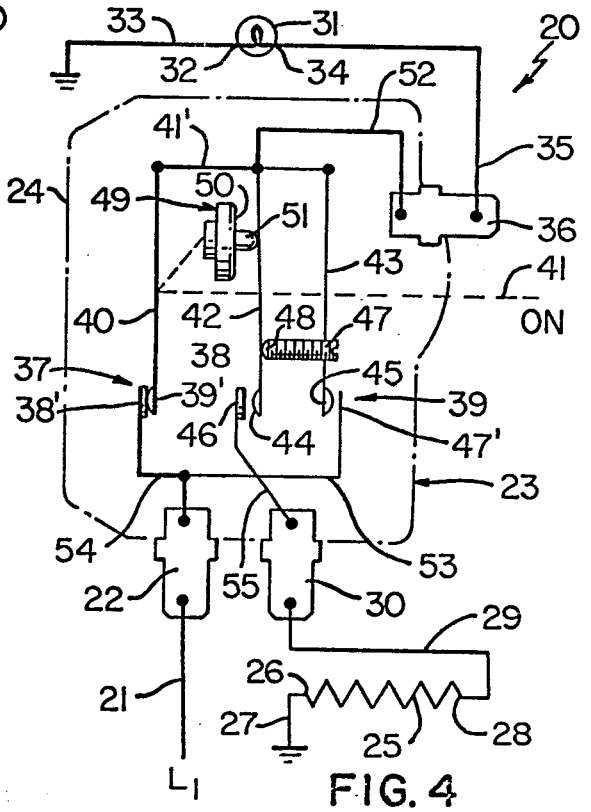
FIG. 4 is a view similar to FIG. 3 and illustrates the control system in an "on" condition thereof and when a demand for operation of the heating means is not being made.
Figure 5:
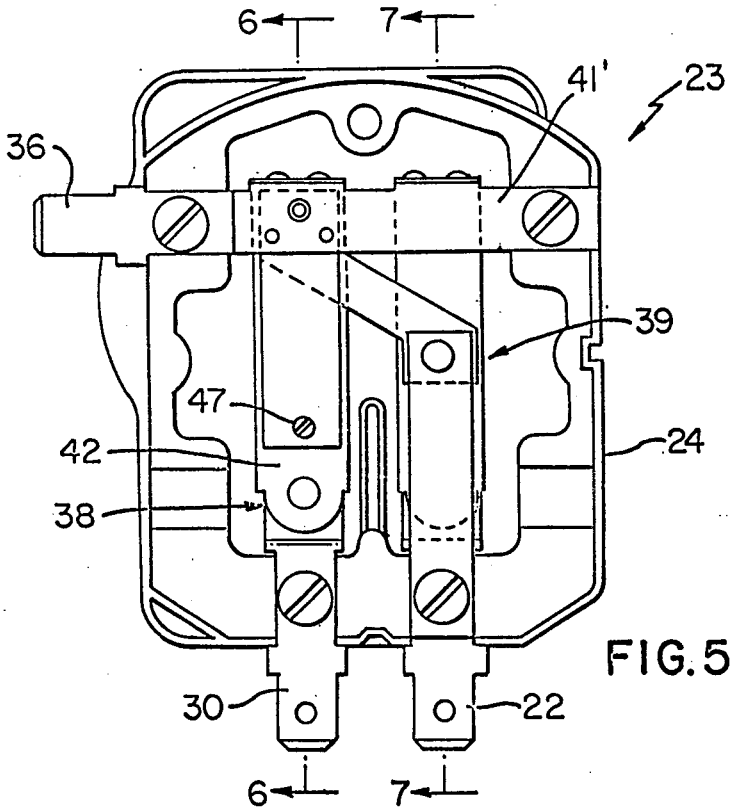
FIG. 5 is a view of the control device utilized in the system of FIGS. 1–4 and with the cover thereof removed.
Figure 6:
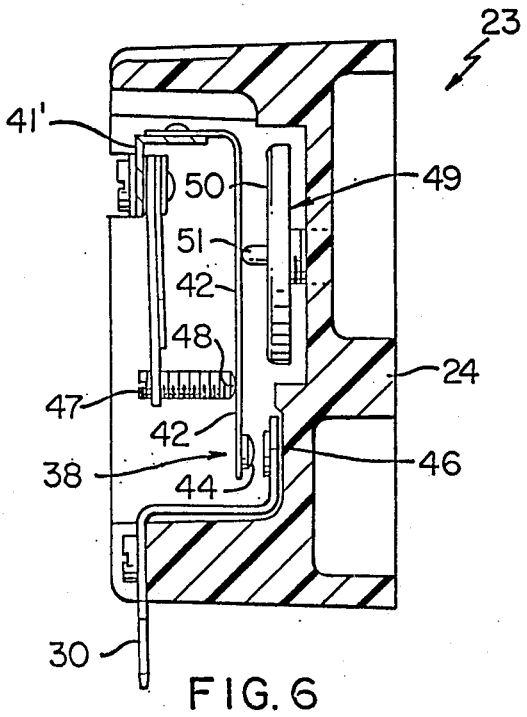
FIG. 6 is a cross-sectional view taken on line 6—6 of FIG. 5.
Figure 7:
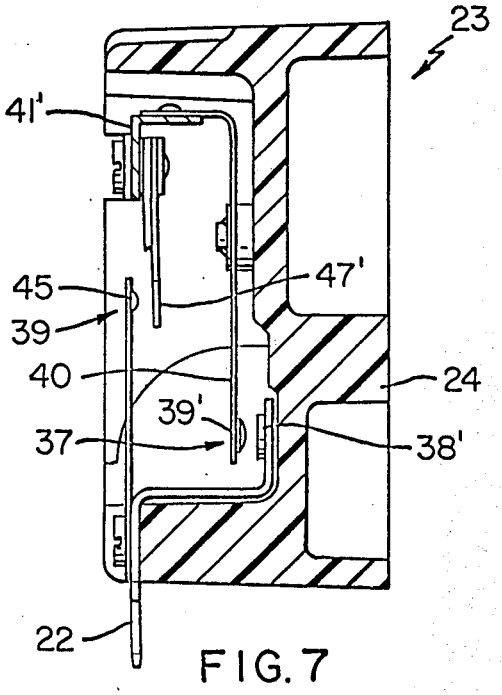
FIG. 7 is a cross-sectional view taken on line 7—7 of FIG. 5.

Referring now to FIGS. 1–4, one control system of this invention is generally indicated by the reference numeral 20 and comprises a power source represented by $L_1$, interconnected by a lead 21 to a terminal 22 of a temperature responsive control device that is generally indicated by the reference numeral 23 and comprises a housing means 24 as illustrated schematically in FIGS. 1–4 and in detail in FIGS. 5–7.

The control system 20 includes an electrical heater element 25 adapted to have one side 26 thereof interconnected by a lead 27 to ground while the other side 28 thereof is interconnected by a lead 29 to another terminal 30 of the control device 23.

The system 20 includes an indicating device 31 which in the embodiment illustrated in the drawings comprises a light bulb having one side 32 thereof interconnected by a lead 33 to ground and the other side 34 thereof interconnected by a lead 35 to another terminal 36 of the control device 23.

The control means or device 23 includes three electrical switches respectively being generally indicated by the reference numerals 37, 38 and 39 in FIGS. 1–4.

Figure 2:
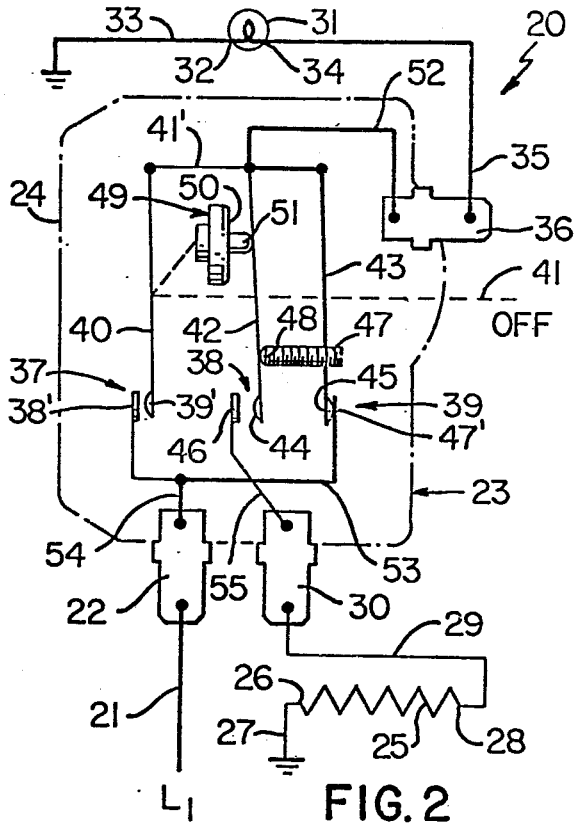
FIG. 2 is a view similar to FIG. 1 and illustrates the control system when set in an "off" condition thereof and the output temperature effect of the heating means is above a certain value thereof.

The electrical switch 37 includes a fixed contact 38' and a movable contact 39' being carried on a switch blade 40 that is controlled by cam means (not shown) of a selector shaft or means 41 of the control device 23 so that when the shaft 41 is disposed in the "off" position of FIGS. 1 and 2, the switch blade 40 is positively held in such a position that the movable contact 39' is maintained out of contact with the fixed contact 38'. However, when the control shaft 41 is set in any "on" position thereof, the cam means of the shaft 41 positively maintains the switch blade 40 to the left so that the contact 39′ is maintained in contact with the fixed contact 38′ as illustrated in FIGS. 3 and 4.

The switch blade 40 of the first switch 37 is interconnected by suitable electrically conductive means 41′ to switch blades 42 and 43 respectively of the switches 38 and 39 whereby the switch blades 42 and 43 comprise movable contacts 44 and 45 of the switches 38 and 39 which respectively have fixed contacts 46 and 47′ for cooperating therewith.

The switch blade 43 of the switch 39 carries a threaded adjusting member 47 which is adapted to have its free end 48 abut against the switch blade 42 as illustrated in the drawings as the natural bias of the blade 43 is toward the blade 42.

A power element 49 has a movable wall 50 provided with an abutment 51 for engaging against the switch blade 42 as illustrated in the drawings, the movable wall 50 being adapted to move to the right when a temperature sensing bulb (not shown) senses an increase in temperature and is adapted to cause the movable wall 50 to collapse to the left when the sensed temperature decreases in a manner well known in the art. Such temperature sensing bulb is so constructed and arranged that the same senses the output temperature effect of the heating means 25 for a purpose hereinafter described whereby the power element 49 is temperature responsive.

The power element 49 is interconnected to the control shaft 41 in a manner well known in the art so that when the control shaft 41 is moved to the "off" position illustrated in FIGS. 1 and 2, the power element 49 is moved to a position to maintain the switch blade 42 in an open condition relative to the fixed contact 46 regardless of the temperature being sensed by the power element 49 and the adjusting member 47 is so constructed and arranged that when the temperature being sensed by the power element 49 is below a certain value, such as 160° F. or the like, the switch blade 43 is also held out of contact with the fixed contact 47′, as illustrated in FIG. 1. However, should the control shaft 41 be disposed in its "off" position and the power element 49 is sensing that the output temperature effect of the heating means 25 is above that certain value, which in the above example is 160° F., the movable wall 50 has expanded to the right a distance sufficient to carry the switch blades 42 and 43 to the right so that the switch blade 43 is placed into contact with the fixed contact 47′ for a purpose hereinafter described.

The conductive means 41′ of the switch blades 40, 42 and 43 is interconnected by lead means 52 to the terminal 36. The fixed contact 38′ of the switch 37 is interconnected by conductive means 53 to the fixed contact 47′ of the switch 39 with the connector means 43 being interconnected to the terminal 22 by a lead 54. The fixed contact 46 of the switch 38 is interconnected by a lead 55 to the terminal 30.

While the various contacts and terminals of the switch construction 23 schematically illustrated in FIGS. 1–4 are shown as being interconnected by wire-like leads, it is to be understood that the same could be formed of bent metal members in the manner fully illustrated in FIGS. 5–7, as desired. However, this invention is not to be limited to any particular configuration of the parts of the control device 23 as illustrated in FIGS. 5–7, as the same can be formed in any desired configuration to operate in a manner now to be described.

With the control shaft 41 of the control device 23 disposed in the "off" condition of FIG. 1, the power element 49 is adjusted to a position so that regardless of the temperature being sensed by the power element 49, the switch blade 42 is held in an open condition relative to the fixed contact 46 by the power element 49 so that no electrical current can be directed from the power source lead 21 to the heating means 25. Likewise, the shaft 41 holds the switch blade 40 in an open condition relative to the fixed contact 38 so that no electrical current flowing from the power source lead 21 can pass through the switch 37.

If the temperature being sensed by the power element 49 is below a certain value, which in the previously described example is 160° F., the position of the switch blade 42 acting on the adjusting member 47 of the switch blade 43 is such that it maintains the switch blade 43 in an open condition relative to the fixed contact 47′ of the switch 39 whereby no electrical current can flow from the conducting means 53 that is interconnected to the power source lead 21 to the terminal 36. Thus, the indicating means 31 is in its "off" condition.

However, should the output temperature effect of the heating means 25 be above the certain value, the power element 49 has the wall 50 thereof disposed to the right a distance sufficient to hold the switch blade 43 into contact with the fixed contact 47′ of the switch 39 so that the electrical current can flow through the indicating means 31 to operate the same to warn that the heating means 25 is still maintaining a heating condition that would be unsafe to work around the heating means 25 or touch the same.

Subsequently, with the control device 23 remaining in the "off" condition, the output temperature effect of the heating means 25 will finally fall below the certain value whereby the power element 49 will have its movable wall 50 collapse sufficiently to the left to permit the switch 39 to open in the manner illustrated in FIG. 1 so that the indicating light 31 will be in the "off" condition illustrated in FIG. 1 and thereby indicate that to the heating means 25 is at a safe temperature.

However, when an operator turns the control shaft 41 to any "on" position thereof as illustrated in FIG. 3, the control shaft 41 through a cam means thereof positively closes the fixed blade 40 against the fixed contact 39′ as illustrated in FIG. 3 and maintains the same in such closed condition whereby electrical current is adapted to flow from the power source lead 21, terminal 22, closed switch 37, and lead 52 through the terminal 36 and indicating means 31 so that the indicating means 31 will be continuously "on" as long as the control shaft 41 is set in any "on" position thereof.

Movement of the control shaft 41 to any "on" condition thereof adjusts the position of the power element 49 so that the same will tend to maintain the output temperature setting of the control shaft 41.

In particular, once the control shaft 41 has been set to a desired temperature setting thereof, such as 300° F., and the power element 49 is sensing that the output temperature effect of the heating means 25 is below the selected temperature, the power element 49 has the wall 50 thereof at such a position thereof that the switch blade 42 is in contact with the fixed contact 46 of the switch 38 so electrical current can flow through the closed switch 37 and the closed switch 38 to the terminal 30, and, thus, through the heating means 25 to cause the same to operate and heat the area where the same is located.

Once the output temperature effect of the heating means 25 reaches or slightly exceeds the selected temperature setting of the shaft 41, the power element 49 has expanded to such condition that the movable wall 50 has opened the switch blade 42 relative to the fixed contact 46 to terminate the flow of current to the heating means 25 until the output temperature effect again falls below the selected temperature whereby the switch 38 will close in the manner illustrated in FIG. 3.

Thus, it can be seen that the switch 38 will be cycled on and off by the power element 49 to tend to maintain the output temperature effect of the heating means 25 at the temperature setting of the control shaft 41 in the manner previously described.

Further, it can be seen that as long as the control shaft 41 is in any "on" condition thereof, the switch 37 is held closed and thereby the indicating lamp 31 is energized to always indicate that the control device is set in an "on" condition thereof.

Also, it can be seen that when the control shaft 41 is subsequently turned to its "off" condition, the switch 37 is opened and the power element 49 positively opens the switch 38 so that no current can flow through the heating means 25. However, should the output temperature effect of the heating means 25 still be above the certain value when the control shaft 41 is turned to its "off" condition, the power element 49 will maintain the switch 39 closed as illustrated in FIG. 2 so that the indicating lamp 31 will now indicate that the heating means 25 is still at an unsafe condition, the indicating means 31 only being turned off when the output temperature effect of the heating means falls below that certain value as illustrated in FIG. 1.

Thus, the indicating means 31 of the control system 20 of this invention provides a dual purpose, namely indicates when the control device 23 is in "on" condition thereof and also indicates an unsafe temperature condition of the heating means 25 when the control device 23 is in "off" condition thereof.

While the control system 20 previously described has the control device 23 provided with three electrical switches 37, 38 and 39 for accomplishing the previously described features, another embodiment of this invention provides the same desired features by utilizing only two electrical switches in the control device thereof.

In particular, reference is now made to FIGS. 8–11 wherein another control system of this invention is generally indicated by the reference numeral 20A and parts of the system 20A similar to the system 20 previously described are indicated by like reference numerals followed by the reference "A."

Figure 10:
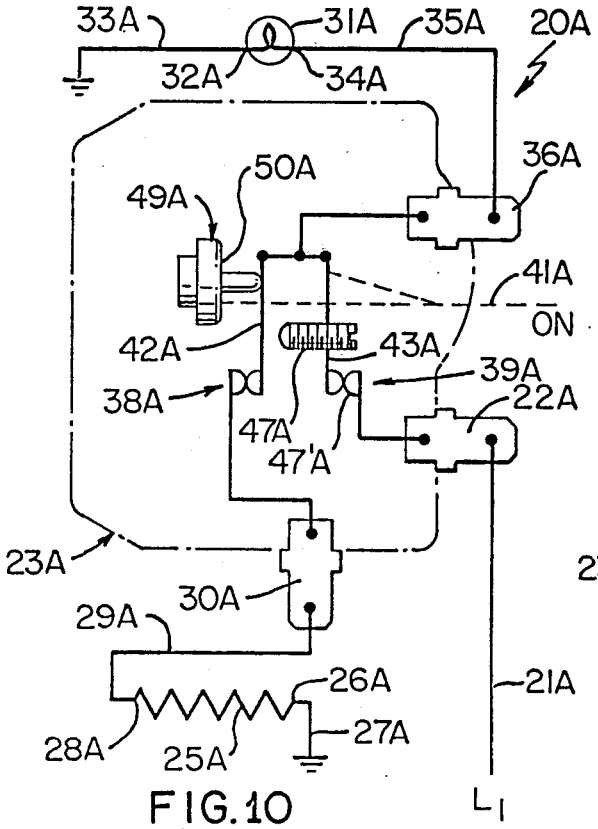
FIG. 10 is a view similar to FIG. 8 and illustrates the control system set in an "on" condition thereof and with a demand being made for the heating means to be operated.
Figure 11:
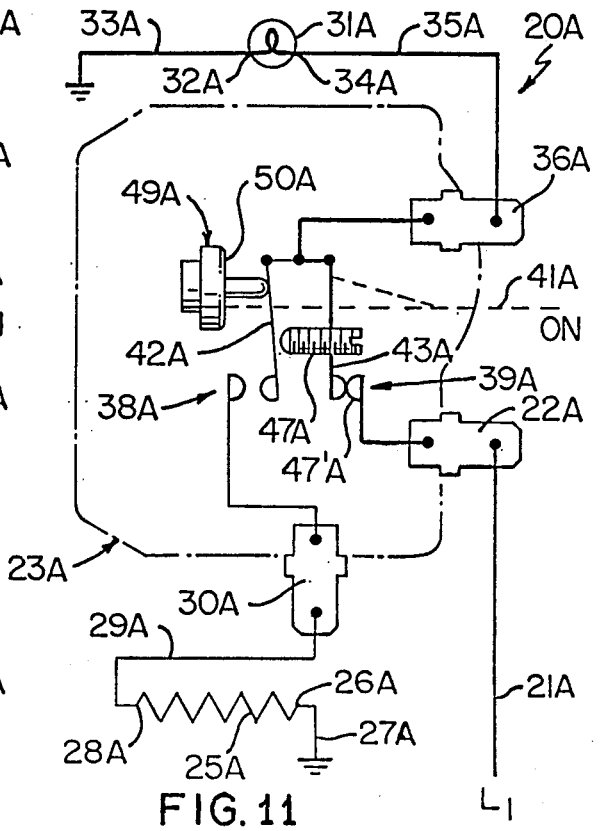
FIG. 11 is a view similar to FIG. 8 and illustrates the control system in an "on" condition thereof and when a demand is not being made that the heating means be in an operating condition thereof.

As illustrated in FIGS. 8–11, the control device or means 23A of the system 20A includes only the electrical switches 38A and 39A as the electrical switch 37 of the control device 23 previously described has been eliminated. However, the control shaft 41A is so constructed and arranged that the same has cam means (not shown) which will maintain the switch blade 43A into contact with the fixed contact 47A' whenever the control shaft 41A is moved to any "on" position thereof as illustrated in FIGS. 10 and 11 whereby electrical current will be supplied from the terminal 22A through the closed switch 39A and terminal 36A to the indicating means 31A to continuously operate the indicating means 31A as long as the control shaft 41A is in any "on" condition thereof. However, when the control shaft 41A is moved to its "off" position thereof, the same has its cam means completely disconnected from the switch blade 43A so that the switch blade 43A is under the control of the switch blade 42A through the adjusting member 47A.

In particular, with the control shaft 41A set in its "off" position, the power element 49A has been so adjusted that the same will always maintain the switch blade 42A in an open position thereof so that no electrical current can flow from the switch blade 42A to the terminal 30A that leads to the heating means 25A. However, should the temperature being sensed by the power element 49A be above a certain value, the movable wall 50A of the power element 49A is disposed to the right a distance sufficient to cause the blade 42A through the adjusting member 47A to hold the switch blade 43A in its closed condition against the fixed contact 47A' in the manner illustrated in FIG. 9 whereby electrical current is supplied through the closed switch 39A to the indicating means 31A to operate the same. Thus, the energized indicating means 31A will provide a warning that the heating means 25A is still maintaining an output temperature effect that is unsafe or above the known certain value thereof.

Figure 8:
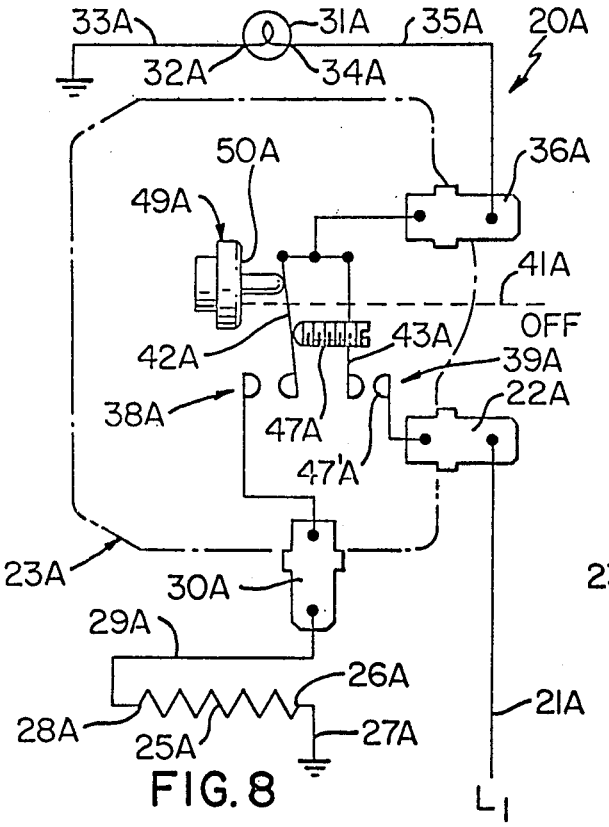
FIG. 8 is a schematic view of another control system of this invention with the control system of FIG. 8 being disposed in an "off" condition thereof and the output temperature effect of the heating means being below a certain value.
Figure 9:
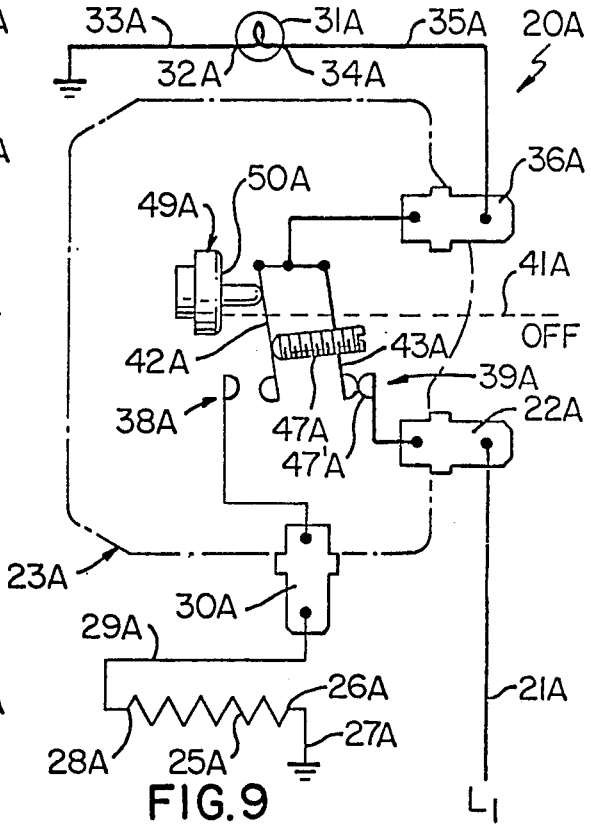
FIG. 9 is a view similar to FIG. 8 and illustrates the control system when in its "off" condition and the output temperature effect of the heating means being above a certain value.

When the output temperature effect of the heating means 25A falls below the certain value with the shaft 41A of the control device 23A in the "off" position thereof, the movable wall 50A of the power element 49A has collapsed sufficiently that the switch blade 43A through its natural bias is permitted to move away from the fixed contact 47A' so that the indicating light 31A is disconnected from the power source lead 21A in the manner illustrated in FIG. 8.

Therefore, it can be seen that the control system 20A and the control device 23A operate in substantially the same manner as the control system 20 and control device 23 previously described except that the switch 37 has been eliminated and the control shaft 41A is so constructed and arranged that the same will always close the switch 39A and maintain the same in a closed condition thereof as long as the shaft 41A is in any "on" condition thereof.

Therefore, it can be seen that this invention not only provides improved control systems and methods of making the same, but also this invention provides improved control devices for such systems or the like.

While the forms and methods of this invention now preferred have been illustrated and described as required by the Patent Statute, it is to be understood that other forms and method steps can be utilized and still come within the scope of the appended claims.

What is claimed is:

1. A control system comprising a source of energy means, heater means, indicator means, and thermostatically operated control means having selector means for setting said control means in a heater means non-temperature producing "off" setting or in a heater means temperature producing "on" setting, said control means having a single temperature responsive device operatively interconnected to said means to interconnect said heater means to said energy means when the output effect of said heater means is below a predetermined "on" setting of said control means and to disconnect said heater means from said energy means when the output effect of said heater means is above said predetermined "on" setting of said control means, said single temperature responsive device of said control means operating said indicating means to indicate that the output effect of said heater means is above a certain value *only* when said control means is in said "off" setting thereof.

2. A control system as set forth in claim 1 wherein said control means has means for interconnecting said energy means to said indicator means when said control means is set in any "on" condition thereof.

3. A control system as set forth in claim 2 wherein said source of energy means comprises a source of electrical power and said indicator means comprises light bulb means.

4. A control system as set forth in claim 2 wherein said source of energy means is a source of electrical power, said heater means being an electrically operated heater means, said indicator means being an electrically operated indicator means.

5. A control system as set forth in claim 4 wherein said control means includes a first electrical switch for interconnecting said energy means to said indicator means and a second electrical switch for interconnecting said energy means to said heater means.

6. A control system as set forth in claim 5 wherein said selector means holds said second switch in an open condition thereof when said selector means is in said "off" position thereof.

7. A control system as set forth in claim 6 wherein said single temperature responsive device operates said first switch when said selector means is in said "off" position thereof.

8. A method of making a control system comprising the steps of providing a source of energy means, providing a heater means, providing indicator means, interconnecting a thermostatically operated control means to said means so as to cause a single temperature responsive device of said control means to interconnect said heater means to said energy means when the output effect of said heater means is below a predetermined "on" temperature producing setting of said control means and to disconnect said heater means from said energy means when the output effect of said heater means is above said predetermined "on" temperature producing setting of said control means, and causing said single temperature responsive device of said control means to operate said indicating means to indicate that the output effect of said heater means is above a certain value *only* when said control means is in an "off" non-temperature producing setting thereof.

9. A method of making a control system as set forth in claim 8 wherein said source of energy means is a source of electrical power, said heater means is an electrically operated heater means, and said indicator means is an electrically operated indicator means, and including the step of providing said control means with a first electrical switch for interconnecting said energy means to said indicator means and a second electrical switch for interconnecting said energy means to said heater means.

10. A method of making a control system as set forth in claim 9 and including the step of providing said control means with a selector means movable from an "off" position to a selected temperature position.

11. A control device for a system having a source of energy means, heater means, and indicator means, said control device having thermostatically operated control means, said control device having a selector means for setting said control means in a heater means non-temperature producing "off" setting or in a heater means temperature producing "on" setting, said control means being provided with a single temperature responsive device for operatively interconnecting to said means to interconnect said heater means to said energy means when the output effect of said heater means is below a predetermined "on" setting of said control means and to disconnect said heater means from said energy means when the output effect of said heater means is above said predetermined "on" setting of said control means, said single temperature responsive device of said control means being adapted to operate said indicating means to indicate that the output effect of said heater means is above a certain value *only* when said control means is in said "off" setting thereof.

12. A control device as set forth in claim 11 wherein said control means has means adapted to interconnect said energy means to said indicator means when said control means is set in any "on" condition thereof.

13. A control device as set forth in claim 12 wherein said source of energy means comprises a source of electrical power and said indicator means comprises light bulb means.

14. A control device as set forth in claim 12 wherein said source of energy means is a source of electrical power, said heater means is an electrically operated heater means, and said indicator means is an electrically operated indicator means.

15. A control device as set forth in claim 14 wherein said control means includes a first electrical switch adapted for interconnecting said energy means to said indicator means and a second electrical switch adapted for interconnecting said energy means to said heater means.

16. A control device as set forth in claim 14 wherein said selector means holds said second switch in an open condition thereof when said selector means is in said "off" position thereof.

17. A control device as set forth in claim 16 wherein said single temperature responsive device is adapted to operate said first switch when said selector means is in said "off" position thereof.

* * * * *